T. B. Garside,
Portable Fence,
Nº 24,930.  Patented Aug. 2, 1859.
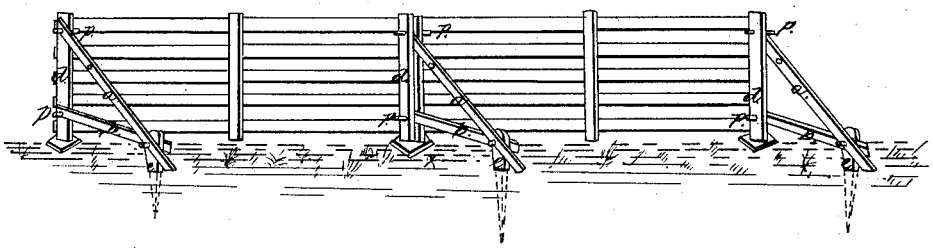
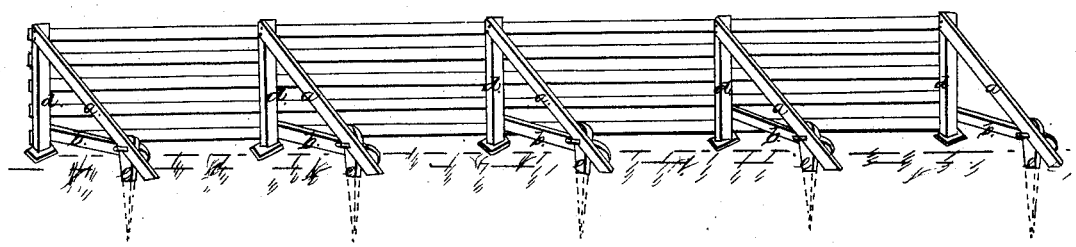
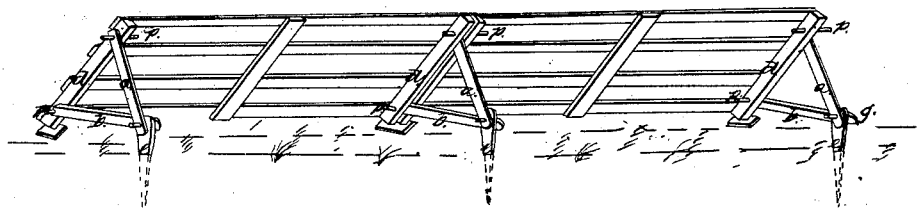
Witnesses:  
Inventor:  
Thomas B. Garside.

UNITED STATES PATENT OFFICE.

THOMAS B. GARSIDE, OF DES MOINES COUNTY, IOWA.

PORTABLE FIELD-FENCE.

Specification of Letters Patent No. 24,930, dated August 2, 1859.

*To all whom it may concern:*

Be it known that I, THOMAS B. GARSIDE, of the county of Des Moines and State of Iowa, have invented a new and Improved Board Fence; and I do hereby declare that the following is a full and exact description thereof, reference being had to the accompanying drawings and to the letters of reference marked thereon.

It is well known that the greatest objection to the ordinary board fence results from the fact that the portions of the posts which are inserted in the ground soon decay, while the boards and the other portions of the posts are perfectly sound. The posts therefore have to be renewed and the whole fence reconstructed entirely, on account of the failure of one portion of each post, while all other parts of the fence would have continued perfectly substantial for many years.

The nature of my invention consists in the combination of the long main posts of the fence, which are held out of the ground, with short auxiliary posts which are driven into the ground, and with a pivoted triangular brace or its equivalent, when the main posts, auxiliary posts and brace are arranged in the relation to one another, and to operate substantially as hereinafter described.

By my mode of constructing board fences, the former is enabled to place the main posts of his fence beyond the influences which cause speedy decay. He is also enabled to remove the short posts as soon as they decay at a slight expense, and without disturbing or reconstructing the main structure; and while these advantages are secured the very important object of having the fence remain perfectly firm and secure in its place is accomplished; for the triangular brace, pivoted to the side auxiliary posts, acts as a stay against the force of the wind in any direction, the lower arm of the brace acting with an oblique lateral pull when the force of the wind acts against the outside of the fence, which oblique, or upward and lateral pull is counteracted by the oblique or lateral and downward thrust of the upper arm of the brace. And said upper brace having its tendency to pull up the post, when the wind forces against the inside of the fence, counteracted by the lower arm of the brace acting antagonistically to it, and thus the auxiliary posts are kept firmly in the ground and the fence cannot possibly be turned over by the wind, whatever be the direction in which it blows. My invention also enables the farmer to turn the fence over so as to have the braces stand on the outside of the panels and thus afford facilities for plowing close up to the panels, as hereinafter specified.

I have one set of short posts *e, e,* which are firmly driven into the earth at a suitable distance from the line of the fence. To each of these posts are attached two braces *a,* and *b,* which are properly fastened to the corresponding posts of the fence *d, d,* at their other extremities. The former of these braces *a, a,* are made so long that their lower ends rest upon the ground, in order to give stability to the fence and prevent it from being overturned. The posts *d, d,* to which the boards are attached are made as long as the desired height of the fence, and its lower end should stand upon a flat stone, or other material to prevent its contact with the earth. The boards are nailed to these posts in the usual way. All except the upper and lower boards may often be advantageously omitted and their place supplied with wire thus making a fence which is cheaper lighter and less affected by the wind. Picket and other ornamental fences, whether of wood or other material may be constructed upon the same plan.

Where a portable fence is desired, I construct it in the manner represented in Fig. 1. In that case the pins *p, p,* each are made to pass through two adjacent posts and through the intervening brace.

If a stationary fence is to be constructed, I follow the plan represented in Fig. 2.

Instead of placing the fence vertical, a sloping position may be given it by shortening the braces *a, a.*

I propose as a modification of the fence above described in some cases to make the braces *a, a,* and *b, b,* of equal length and by sawing off the outer extremities and making the fence in sections of suitable length, these sections may be made to revolve over around the centers *g, g.* This modification may frequently be found convenient and useful where there is a pasture upon one side of the fence and a plowed field upon the other. The arrangement may in that case be such that not one foot of land shall be lost, as the fence may be revolved outward from the field while the same is being plowed and then revolved back again so as to rest upon the very verge of the plowed ground. A plan of such a fence is found represented in Fig. 3.

If an old fence,—board, post and rail or picket—is to be repaired it can be done by attaching the posts $e$, $e$, and braces $a$, and $b$, and sawing off the old posts $d$, at the surface of the ground and placing under the same some material for it to rest upon.

What I claim as my invention and desire to secure by Letters Patent, is—

The combination of the long main posts $d$, short auxiliary posts $e$, and triangular pivoted brace $a$, $b$, or its equivalent, when arranged in the relation to one another and to operate, substantially as and for the purpose set forth.

THOMAS B. GARSIDE.

Witnesses:
W. N. CLAUBAUGH,
F. W. BROOKS.